US012205534B2

(12) United States Patent
Sun et al.

(10) Patent No.: US 12,205,534 B2
(45) Date of Patent: Jan. 21, 2025

(54) PIXEL DEGRADATION TRACKING AND COMPENSATION FOR DISPLAY TECHNOLOGIES

(71) Applicant: NVIDIA Corporation, Santa Clara, CA (US)

(72) Inventors: Yanbo Sun, Los Altos, CA (US); Tyvis Cheung, Sunnyvale, CA (US); Gerrit Slavenburg, Hayward, CA (US)

(73) Assignee: NVIDIA Corporation, Santa Clara, CA (US)

(*) Notice: Subject to any disclaimer, the term of this patent is extended or adjusted under 35 U.S.C. 154(b) by 18 days.

(21) Appl. No.: 17/148,109

(22) Filed: Jan. 13, 2021

(65) Prior Publication Data

US 2022/0223104 A1 Jul. 14, 2022

(51) Int. Cl.
*G09G 3/3208* (2016.01)
*G09G 3/20* (2006.01)

(52) U.S. Cl.
CPC ......... *G09G 3/3208* (2013.01); *G09G 3/2003* (2013.01); *G09G 2300/0452* (2013.01); *G09G 2320/0285* (2013.01); *G09G 2320/045* (2013.01); *G09G 2360/12* (2013.01)

(58) Field of Classification Search
None
See application file for complete search history.

(56) References Cited

U.S. PATENT DOCUMENTS

| | | | | |
|---|---|---|---|---|
| 10,943,531 | B1 * | 3/2021 | Chen | G09G 3/3208 |
| 2002/0126115 | A1 * | 9/2002 | Ijntema | G09G 5/363 345/214 |
| 2004/0218134 | A1 * | 11/2004 | Kojima | G09G 3/3611 349/155 |

(Continued)

FOREIGN PATENT DOCUMENTS

| | | | |
|---|---|---|---|
| CN | 1860521 | A | 11/2006 |
| CN | 102136265 | A | 7/2011 |

(Continued)

OTHER PUBLICATIONS

Yanbo, et al.; First Office Action for Chinese Patent Application No. 202210015887.6, filed Jan. 7, 2022, mailed Jul. 29, 2023, 13 pgs. Published Abstract Included.

(Continued)

*Primary Examiner* — Benjamin X Casarez
(74) *Attorney, Agent, or Firm* — Taylor English Duma L.L.P.

(57) ABSTRACT

Certain display types—such as organic light emitting diode (OLED) displays—may be more prone to burn-in or ghosting due to the varied luminance degradation rates of pixel cells of the display—especially in applications or content types that require display of prolonged, continuous, static textures. To account for this, aging of pixel cells (e.g., R, G, B, and/or W pixel cells) of a display may be tracked such that more aged pixel cells may be compensated for by reducing pixel values of one or more (e.g., each) other pixel cells of the display. As a result, the effect of burn-in or (Continued)

ghosting may be mitigated by tracking luminance degradation over time and compensating for the luminance degradation across some or all of the pixel cells of the display.

22 Claims, 9 Drawing Sheets

(56) References Cited

U.S. PATENT DOCUMENTS

| | | | | |
|---|---|---|---|---|
| 2007/0146385 | A1* | 6/2007 | Kienhoefer | G09G 3/22 345/593 |
| 2013/0176324 | A1* | 7/2013 | Yamashita | G09G 3/32 345/589 |
| 2018/0350290 | A1* | 12/2018 | Drzaic | G06F 3/0656 |
| 2018/0350296 | A1* | 12/2018 | Thompson | G06F 3/0673 |
| 2019/0026861 | A1* | 1/2019 | Kim | G09G 3/3208 |
| 2019/0156737 | A1* | 5/2019 | Choi | G09G 3/2003 |
| 2020/0058249 | A1* | 2/2020 | Ok | G09G 3/3208 |
| 2020/0184887 | A1* | 6/2020 | Nien | G09G 3/3225 |
| 2021/0056912 | A1* | 2/2021 | Park | G09G 3/3275 |
| 2021/0183333 | A1* | 6/2021 | Holland | G09G 3/3208 |
| 2021/0192998 | A1* | 6/2021 | Song | G09G 3/006 |
| 2022/0013069 | A1* | 1/2022 | An | G09G 3/2025 |
| 2022/0028319 | A1* | 1/2022 | Kim | G09G 3/20 |
| 2022/0139290 | A1* | 5/2022 | Kang | G09G 3/32 345/694 |
| 2022/0139309 | A1* | 5/2022 | Ok | G09G 3/3225 345/214 |

FOREIGN PATENT DOCUMENTS

| | | | |
|---|---|---|---|
| CN | 103208270 | A | 7/2013 |
| CN | 103730090 | A | 4/2014 |
| CN | 109643438 | A | 4/2019 |
| CN | 110838278 | A | 2/2020 |
| CN | 111641820 | A | 9/2020 |

OTHER PUBLICATIONS

Sun, Yanbo; Third Office Action for Chinese Patent Application No. 202210015887.6, filed Jan. 7, 2022, mailed Jul. 2, 2024, 5 pgs.

Sun, Yanbo, Second Office Action for Chinese Patent Application No. 202210015887.6, filed Jan. 7, 2022, mailed Feb. 24, 2024, 5 pgs.

* cited by examiner

310A

LONG TERM AGING

| PIXEL VALUE | 0% | 5% | 10% | 15% | 20% | 25% | 30% |
|---|---|---|---|---|---|---|---|
| 100% | 1.50% | 1.40% | 1.35% | 1.30% | 1.25% | 1.23% | 1.20% |
| 87.5% | 1.21% | 1.13% | 1.09% | 1.05% | 1.01% | 0.99% | 0.97% |
| 75.0% | 1.09% | 1.02% | 0.98% | 0.94% | 0.91% | 0.89% | 0.87% |
| 62.5% | 0.92% | 0.86% | 0.82% | 0.79% | 0.76% | 0.75% | 0.73% |
| 50.0% | 0.62% | 0.57% | 0.55% | 0.53% | 0.51% | 0.50% | 0.49% |
| 37.5% | 0.46% | 0.42% | 0.40% | 0.38% | 0.37% | 0.36% | 0.35% |
| 25.0% | 0.16% | 0.15% | 0.14% | 0.14% | 0.13% | 0.13% | 0.13% |
| 12.5% | 0.04% | 0.03% | 0.02% | 0.02% | 0.02% | 0.02% | 0.02% |

FIGURE 3B

310B

LONG TERM AGING

| PIXEL VALUE | 0% | 5% | 10% | 15% | 20% | 25% | 30% |
|---|---|---|---|---|---|---|---|
| 100% | 255 | 238 | 229 | 221 | 212 | 208 | 204 |
| 87.5% | 206 | 191 | 184 | 177 | 171 | 167 | 164 |
| 75.0% | 185 | 172 | 166 | 160 | 153 | 150 | 147 |
| 62.5% | 157 | 145 | 140 | 134 | 129 | 126 | 124 |
| 50.0% | 104 | 97 | 93 | 89 | 86 | 84 | 82 |
| 37.5% | 78 | 71 | 68 | 65 | 62 | 61 | 60 |
| 25.0% | 27 | 25 | 24 | 23 | 22 | 21 | 21 |
| 12.5% | 6 | 5 | 4 | 3 | 3 | 3 | 3 |

FIGURE 3C

PIXEL DEGRADATION TRACKING AND COMPENSATION FOR DISPLAY TECHNOLOGIES

BACKGROUND

The use of organic light emitting diode (OLED) display panels continues to increase—e.g., in smartphones, television displays, etc.—due to their fast response times, wide viewing angle, color rendering capabilities, lower power consumption, and capability of being implemented as transparent and/or flexible displays. However, because each pixel cell of an OLED panel is its own light source, OLED displays may suffer from burn-in as a result of uneven permanent luminance degradation over time. For example, certain pixel cells may degrade faster than others and, when this happens, a persistent part of an image on a screen—such as navigation buttons on a phone display, logos on a television display, icons on a computer display, etc.—may appear as a ghost (or burned-in) background. This burn-in may not only compromise the quality of the image, but the comprised quality of the image may reduce the efficacy of image assessment in safety critical applications, such as medical imaging. For example, where a medical image is being displayed on an OLED display with burn-in, the evaluator may not be able to clearly assess the image due to the ghosting effect of the burn-in. This may render the display unsuitable for such applications, or require frequent replacement of the display to ensure safety and quality standards are upheld. As a result of these drawbacks to OLEDs, OLED display technology has not been as widely implemented in computer monitors or displays, laptop displays, and/or the like, as these display types are often associated with applications—such as computer applications or gaming applications—that include various stationary icons, logos, tools, and/or the like that, over time, result in burn-in for OLED display types.

To address these various issues, techniques have been implemented to reduce or slow the luminance degradation (e.g., aging effect) of the OLED displays over time. For example, in some applications, the maximum brightness of the display may be reduced or limited. However, this approach reduces the quality of the displayed content as the reduction in brightness is at the sacrifice of the high brightness and high contrast capabilities of an OLED display. Similarly, such as in smartphone displays, aggressive sleep modes may be used to force the display to turn off after short periods of nonuse. This approach may be effective in smartphone applications, where consistent long term use is less frequent, but is not practical for OLED displays used in computing, gaming, medical imaging, or other technologies where a prolonged consistent display of content is required. For example, when drafting a document in a word processing application, turning the display on and off to force periods of sleep would not be a practical solution to reducing burn-in on the display. As another example, some conventional techniques include modifying or reducing brightness of high intensity textures at a same location on a screen—such as a logo or a game score on a television display. While this may be practical where the portion of the content with reduced brightness accounts for a small portion of the displayed content, this approach may suffer where the application or content being displayed includes a substantial amount of logos, scores, tools, or other consistently displayed information. In some systems, active window locations or pixels of an entire displayed image may be shifted around on the display to prevent a same image—or portion thereof—from being displayed on the same pixel cells for an extended period of time. However, this shifting not only increases latency (which is critical to performance of applications such as gaming) due to additional required processing, but detracts from the user experience as the window shifts around the display.

Each of these techniques may not be suitable for OLED displays—such as integrated displays of laptop computers, standalone displays for desktop computer or multi-monitor setups, and/or other OLED display implementations used within applications that require prolonged continuous display of static content—due the high brightness and color reproduction demands for desktop, office, imaging, and gaming applications. For example, due to the demand for daily long hours of continued operation displaying static textures such as text, icons, status bars, logos, and/or the like, these conventional techniques would either not be practical or effective (e.g., forced sleep) and/or would reduce the quality of the user experience (e.g., lowering brightness or shifting windows).

SUMMARY

Embodiments of the present disclosure relate to pixel degradation tracking and compensation for display technologies. Systems and methods are disclosed that track the aging of pixel cells (e.g., R, G, B, or W pixel cells, or a combination thereof) of a display or monitor—such as an organic light emitting diode (OLED) display—and compensate for the aging to reduce or eliminate burn-in or ghosting of displayed images. For example, to compensate for more aged cells, pixel (or color) values for other cells may be reduced to compensate for the reduced ability of the aged cells to produce expected or peak luminance outputs. As another example, the more aged cells may have increased pixel values—where possible—to increase the luminance of the cells to more accurately reflect the desired pixel value for the cell. As such, an aged pixel cell may have its pixel value increased and/or pixels values of other cells on the display may be reduced to compensate for the luminance degradation of the aged pixel cell. As a result, the effect of burn-in or ghosting may be mitigated by tracking luminance degradation over time and compensating for the luminance degradation by adjusting pixel values for one or more pixel cells of the display.

To determine long term aging of pixel cells, the aging may be modeled as a percentage drop of the luminance compared to an original luminance of the cell when driven by the same pixel value. As such, for each display model or type, luminance degradation for each pixel cell type at various ages and with various pixel values may be tracked to determine micro decay rates corresponding to the pixel cell type. For example, a red (R) pixel cell may decay at a different rate than a blue (B) pixel cell, and so on, and for a first display type or model the pixel cells may decay at a different rate than a second display type or model, and so on.

Once modeled, the micro decay for each pixel cell may be tracked for each frame using the current aging of the pixel cell, the input pixel value for the pixel cell, the refresh time or rate (e.g., static refresh rate or current refresh rate, where variable refresh rate is used) of the display, and/or other operating conditions. In some embodiments, the micro decay may be tracked using a combination of short term aging accumulators and long term aging accumulators. For example, to track the micro decay over the life of a display panel, the amount of data required may be prohibitive (e.g., due to latency concerns) to only storing and updating the micro decay information using a long term accumulator. As a result, a fast access frame buffer (e.g., an external double data rate (DDR) memory or on-chip static random-access memory (SRAM)) may be used for short term aging accumulation on a per-frame basis to keep up with a refresh rate of a display—e.g., 60 Hz, 120 Hz, 240 Hz, etc.—and periodically the accumulated short term aging data may be offloaded to a long term aging accumulator (e.g., an external FLASH memory), and the short term aging accumulators may be reset for a next period. In some embodiments, to reduce memory access bandwidth, temporal spatial sub-sample accumulation may be used to track decay of pixels such that, at each time step, a subset of the pixel cells within a group (e.g., a 4×4 group of pixel cells) are tracked and other pixel cells within a same group may be kept constant over some number of frames (e.g., 4, 8, 10, etc.) based on a prior computed decay value.

For each frame, the accumulated aging or luminance degradation of one or more pixel cells (e.g., a cell having the maximum long term aging decay) may be used to identify an updated peak luminance for the display, and this updated peak luminance may be used to adjust the pixel values for one or more (e.g., each) of the other pixel cells of the display to compensate for the degradation. As a result, the displayed content may include little to no visual evidence (e.g., ghosting, burn-in, etc.) of luminance degradation as the aged pixel cells may be compensated for. As such, by accounting for the drawbacks of burn-in or ghosting in traditional displays or monitors, the systems and methods described herein may allow for display types where each pixel cell is its own light source—such as OLED displays—to be effectively implemented for use with gaming, medical imaging, computer, or other application types that require continued display of static textures.

BRIEF DESCRIPTION OF THE DRAWINGS

The present systems and methods for pixel degradation tracking and compensation for display technologies are described in detail below with reference to the attached drawing figures, wherein:

FIG. 3B is a table depicting aging rates for a pixel cell at different aging life percentages and different pixel values, in accordance with some embodiments of the present disclosure;

FIG. 3C is a table depicting quantized and normalized decay values for a pixel cell at different aging life percentages and different pixel values, in accordance with some embodiments of the present disclosure;

DETAILED DESCRIPTION

Systems and methods are disclosed related to pixel degradation tracking and compensation for display technologies. Although embodiments of the present disclosure may be described primarily with respect to organic light emitting diode (OLED) displays or monitors, this is not intended to be limiting, and the systems and methods described herein may be implemented for other display technologies where each pixel or pixel cell is a light source, or is its own light source, such as in plasma displays. In embodiments where an OLED display or monitor is used, the OLED display may include a passive matrix OLED (PMOLED), an active matrix OLED (AMOLED), and/or another OLED type, without departing from the scope of the present disclosure. In addition, the display type may include a flat display, a curved display, a flexible display, a transparent display, and/or another display type.

Figure 1:
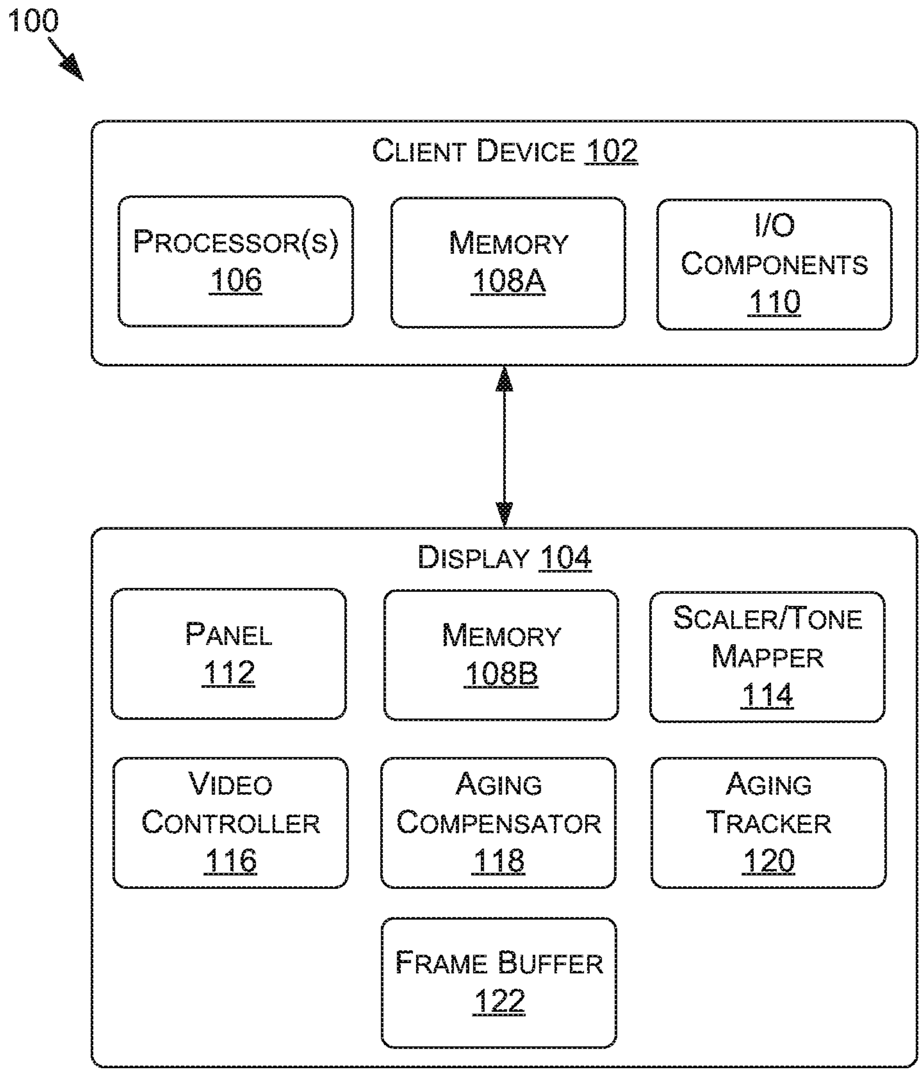
FIG. 1 depicts a luminance degradation compensation system, in accordance with some embodiments of the present disclosure.

With reference to FIG. 1, FIG. 1 is an example luminance degradation compensation system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, one or more of the components, features, and/or functionalities of the system 100 may correspond to or be executed using one or more components, features, and/or functionalities similar to those described with respect to example computing device 800 of FIG. 8 and/or example data center 900 of FIG. 9, described herein.

The system 100 may include one or more client devices 102 and/or one or more displays (or monitors) 104. The client device(s) 102 may include one or more processors 106 (e.g., central processing units (CPUs), graphics processing units (GPUs), etc.), memory 108A (e.g., for storing long term aging data, etc.), and/or input/output (I/O) component(s) 110 (e.g., a keyboard, a mouse, a remote, a game controller, a touch screen, etc., which may be similar to I/O components 814 of FIG. 8). The display(s) 104 may include a panel 112 (e.g., an OLED panel, or another panel type where each pixel cell is its own light source), memory 108B (e.g., for storing image data rendered by the processor(s) 106 in the frame buffer 122, for storing long term aging data, short term aging data, etc.), a scaler/tone mapper 114, a video controller 116 (e.g., for encoding, decoding, and/or scanning out the image according to a scan order), an aging compensator 118, an aging tracker 120, and/or a frame buffer 122. In some embodiments, the aging compensator 118 and/or the aging tracker 120 may be executed using the video controller 116, the memory 108, the scaler/tone mapper 114, and/or the processor(s) 106. The system 100 may correspond to a single device (e.g., a laptop, tablet, smartphone, and/or other client device 102 type that includes an integrated display 104), a combination of two or more devices (e.g., a remote client device type (e.g., a virtual computing device comprised in a data center), a local client device type (e.g., a desktop computer coupled to a display 104, a gaming console coupled to a display 104, a streaming device coupled to a display 104), etc.), or a combination thereof. As such, the client device 102 and the display 104 may correspond to a same integrated device, or may correspond to two separate devices. In some embodiments, the components, features, and/or functionality described with respect to the client device 102 may be executed by, instantiated in, or integrated into the display 104, and/or the components, features, and/or functionality described with respect to the display 104 may be executed by, instantiated in, or integrated into the client device 102. As such, the distribution of components, features, and/or functionality with respect to FIG. 1 is for example purposes only.

Figure 9:
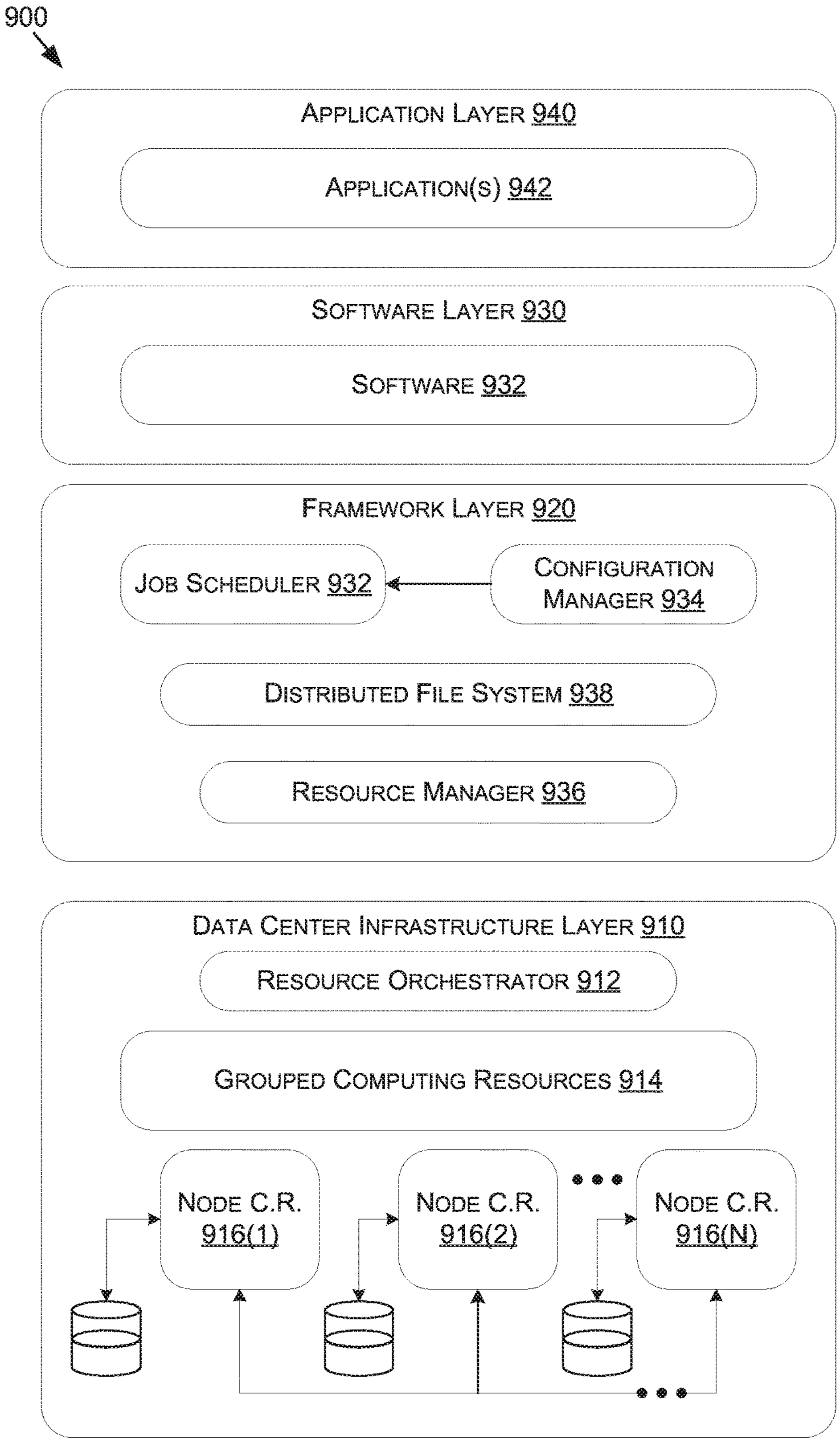
FIG. 9 is a block diagram of an example data center suitable for use in implementing some embodiments of the present disclosure.

For a non-limiting example, the client device 102 may be a component or node of a distributed computing system—such as a cloud-based system (e.g., executed in one or more data centers, such as the example data center 900 of FIG. 9)—for streaming images, video, video game instances, etc. In such embodiments, the client device 102 and/or the display 104 may communicate with one or more computing device(s) (e.g., servers, virtual computers, etc.) over a network(s) (e.g., a wide area network (WAN), a local area network (LAN), or a combination thereof, via wired and/or wireless communication protocols). For example, a computing device(s) may generate and/or render an image, encode the image, and transmit the encoded image data over the network to the client device 102 and/or the display 104 (e.g., a streaming device, a television, a computer, a computer monitor, a smartphone, a tablet computer, a gaming console, etc.). The receiving device may decode the encoded image data, reconstruct the image (e.g., assign a color or pixel value to each pixel), store the reconstructed image data in the frame buffer 122, scan the reconstructed image data out of the frame buffer 122—e.g., using the video controller 116—according to a scan order to generate display data, and then transmit the display data for display by a display device (e.g., the panel 112 of the display 104) of the system 100. Where the image data is encoded, the encoding may correspond to a video compression technology such as, but not limited to, H.264, H.265, M-JPEG, MPEG-4, etc.

In some embodiments, the pixel or color values for each pixel cell may be updated or adjusted to compensate for the aging of one or more pixel cells (e.g., a most aged pixel cell), as described herein. Where the client device 102 and/or the display 104 are included in a cloud based system, the pixel or color value compensation may be executed locally and/or in the cloud. For example, in some embodiments, the data received from a cloud server(s) may already represent updated color values for the pixel cells of the display 104 (e.g., the aging compensator 118 may be instantiated in the cloud), while in other embodiments the received data from the cloud server(s) may not represent the updated color values, and the aging compensator 118 may adjust the color values locally prior to presentation on the display 104. In some embodiments, the aging compensator may be instantiated both in the cloud and locally.

Additionally, with respect to the aging tracker 120, the aging tracker 120 may track the aging of the pixel cells of the panel 112 of the display 104, as described herein. This process may be instantiated in the cloud, in embodiments, such that the aging tracker 120 is—at least partly—instantiated in the cloud using one or more cloud servers. For example, both the short term aging (STA) accumulation may be executed in the cloud and the long term aging (LTA) accumulation may be executed in the cloud. However, in other non-limiting embodiments, the STA accumulation may be executed locally (e.g., for latency reasons and to improve performance of the aging tracker 120) while the LTA accumulation may be executed in the cloud. In such an example, the LTA accumulation data may be used to update pixel values of the streamed or otherwise transmitted data from the cloud prior to streaming. In other examples, both the STA accumulation and the LTA accumulation may be executed locally—e.g., by the client device 102 and/or the display 104.

As another example, the client device(s) 102 may include a local device—e.g., a game console, a disc player, a smartphone, a computer, a tablet computer, a streaming device, etc. In such embodiments, the image data may be transmitted over a network(s) (e.g., a LAN) via a wired and/or wireless connection. For example, the client device(s) 102 may render an image (which may include reconstructing the image from encoded image data), store the rendered image in the frame buffer 122, update the image data using the aging compensator 118, scan out the (updated) rendered image—e.g., using the video controller 116—according to a scan order to generate display data, and transmit the display data to a display device (e.g., the panel 112) for presentation or display.

As such, whether the process of generating a rendered image for storage in the frame buffer 122 occurs internally (e.g., within the display 104, such as a computer monitor), locally (e.g., via a locally connected client device 102), remotely (e.g., via one or more servers in a cloud-based system), or a combination thereof, the image data representing values (e.g., color values, updated color values after aging compensation, etc.) for each pixel cell of the display 104 may be scanned out of the frame buffer 122 (or other memory device) to generate display data (e.g., representative of voltage values) configured for use by the display 104.

The processor(s) 106 of the client device 102 (which may alternatively be comprised in the display 104 and/or in one or more virtual or discrete computing devices in a cloud based architecture) may include a GPU(s) and/or a CPU(s) for rendering image data representative of still images, video images, and/or other image types. Once rendered, or otherwise suitable for display by the display 104 of the system 100, the image data may be stored in memory 108A and/or 108B—such as in the frame buffer 122. In some embodiments, the aging compensator 118 may be used to update the image data stored in the memory 108A and/or 108B to compensate for the aging of one or more pixel cells of the panel 112 of the display 104, as described herein.

The panel 112 may correspond to a display type where each pixel cell is or has its own light source—such as, without limitation, an OLED panel. The panel 112 may include any number of pixel cells that may each correspond to a pixel or a sub-pixel of a pixel. For example, the panel 112 may include a RGB panel where each pixel cell may correspond to a sub-pixel having an associated color (e.g. red, green, or blue) associated therewith. As another example, the panel 112 may include a white-only panel where each pixel cell corresponds to a white sub-pixel having an associated color filter that is used to generate the sub-pixel color value (e.g., red, green, or blue). In such an example, a first pixel cell may correspond to a first sub-pixel with a red color filter in series therewith, a second pixel cell may correspond to a second white sub-pixel with a blue color filter in series therewith, and so on. Although an RGB panel 112 is described herein, this is not intended to be limiting, and any different individual color or combination of colors may be used depending on the embodiment. For example, in some embodiments, the panel 112 may include a monochrome or grayscale (Y) panel that may correspond to some grayscale range of colors from black to white. As such, a pixel cell of a Y panel may be adjusted to correspond to a color on the grayscale color spectrum. In other non-limiting examples, RGBW panels or blue only panels may be used.

Once the final or updated color values (e.g., color values, voltage values, etc.) are determined for each pixel cell of the panel 112—e.g., using the aging compensator 118, the frame buffer 122, the video controller 116, etc.—signals corresponding to the values may be applied to each pixel cell. In some embodiments, the color values may be applied to the pixel cells using a single scan, dual scan, and/or other scan type.

Figure 2:
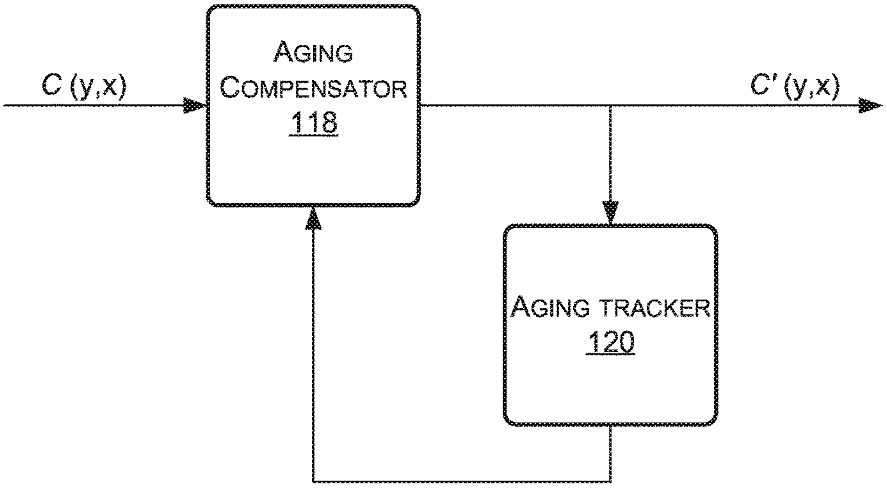
FIG. 2 depicts a data flow diagram for pixel value compensation based on pixel cell again, in accordance with some embodiments of the present disclosure.

With reference to FIG. 2, the aging compensator 118 may be used to update an initial color value, C (y, x), for a pixel cell to an updated color value, C' (y, x). For example, the aging tracker 120 may track the age of each pixel cell, and the age of the pixel cell—in addition to the age of one or more other pixel cells (such as the most aged pixel cell, in embodiments)—may be used to adjust the initial color value to the updated color value. In order to determine the aging compensation for the pixel cell, the age of the pixel cell may be determined. The age of the pixel cell may be calculated over time using the aging tracker 120. For example, for each frame that is displayed, a micro decay value may be determined for the pixel cell based on a variety of factors, such as a current aging life of the pixel cell, the color or pixel value, the refresh rate (e.g., which dictates the amount of time the pixel cell is activated each frame), and/or other operating conditions. This micro decay value may be used to add to the overall decay of the pixel cell, and this accumulation of micro decays may correspond to the current aging of the pixel cell.

As such, to determine the micro decay values for each pixel cell type, one or more lookup tables (LUTs) may be generated during testing or experimentation. For example, for each display type or model, testing or experimentation may be conducted to determine the decay rates of pixel cell types for the display. For example, decay rates for red pixel cells may be different than decay rates for blue pixel cells, decay rates for red pixel cells at 10% aging may be different than decay rates for red pixel cells at 30% aging, decay rates for pixel cells in one display model or type may be different than decay rates for pixel cells of another display model or type, decay rates for pixel cells at one refresh rate may be different than decay rates for pixel cells at another refresh rate, and so on. As such, testing and experimentation may be used to determine, for a particular display model or type, the various decay rates or decay values for the pixel cells of the display at various LTA values, for various pixel values, and/or for various refresh rates. In some embodiments, the aging (e.g., LTA) of a pixel cell (e.g., an OLED cell) may be modeled as a percentage drop in luminance of the pixel cell—e.g., an LTA value of 5.5f may represent a 5.5% drop in luminance (e.g., measured in Candela/$m^2$ or nits) compared to the original luminance value when the pixel cell is driven by the same pixel value. As such, for a non-limiting example, where a pixel value of 180 (on a scale from 0-255) for a pixel cell may have a luminance value of 300 nits when at 0% aged (e.g., new), an LTA value of 5.5f may indicate that the luminance value of the pixel cell when driven with 180 results in 283.5 nits (300 nits-16.5 nits).

Figure 3A:
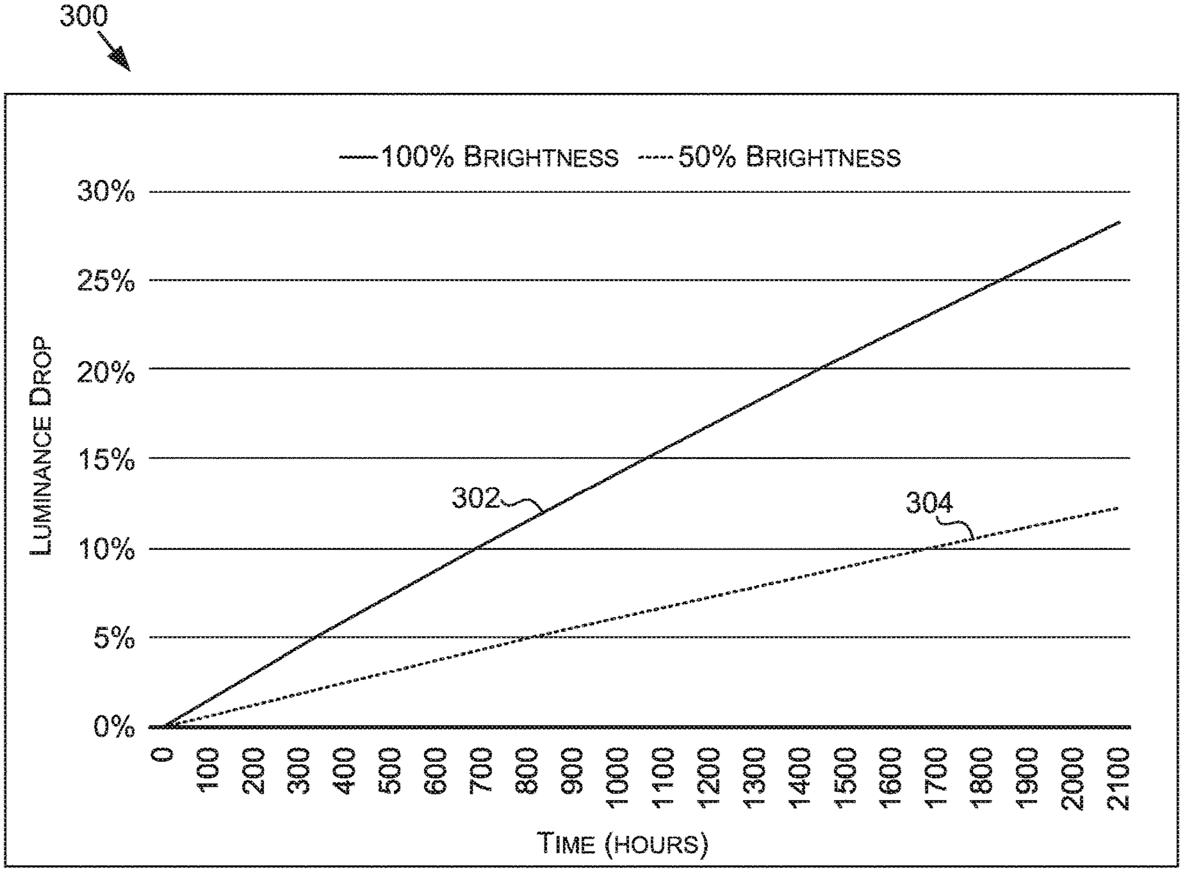
FIG. 3A depicts a chart for tracking pixel cell aging over time at various brightness levels, in accordance with some embodiments of the present disclosure.

As an example, and with respect to FIG. 3A, chart 300 may represent the decay rate or luminance drop for a pixel cell over time, measured at varying brightness (or color value) levels—e.g., 100% brightness (or maximum color value) as illustrated by line 302 and 50% brightness (or 50% of maximum color value) as illustrated by line 304. For example, a maximum color value (e.g., 100% brightness) may be driven to a pixel cell over some period of time (e.g., 2100 hours in chart 300), and the luminance drop % may be measured over this period of time to determine the decay rate for the pixel cell over time at a maximum color value. This process may be similarly repeated for 50% brightness, as illustrated in FIG. 3A, and/or for any number of other brightness percentages depending on the granularity desired for the lookup table.

With respect to FIG. 3B, table 310A may correspond to a result of testing or experimentation of a pixel cell type at various brightness levels (or pixel values) over time, where the luminance drop % is measured. For example, the long term aging (LTA) values and pixel values may have corresponding luminance drop %'s. The luminance drop %'s in the table 310A may, for non-limiting example, correspond to the luminance drop % after 100 hours driving the panel at the associated pixel value and LTA value for the cell in the table. The table 310A may also correspond to a particular refresh rate of the display 104 (e.g., 60 Hz). For example, a new pixel cell (e.g., at 0% aging life) that is driven with a maximum color value (e.g., a brightness of 100%) for 100 hours with a refresh rate of 60 Hz may result in a 1.5% luminance drop, whereas an older pixel cell (e.g., 15% aging life) that is driven with a lower color value (e.g., a brightness of 37.5%) for 100 hours with a refresh rate of 60 Hz may result in a 0.38% luminance drop. Although various LTA values and pixel values are illustrated in table 310A, this is not intended to be limiting, and is for example purposes only. In other examples, the table 310A may extend in any range from 0% to 100% aging life at similar or different intervals (e.g., every % point, every other % point, every 5% points, every 10% points, and so on), and/or may include pixel values that extend in any range from 0% (e.g., color value of 0 on scale of 0-255) to 100% (e.g., color value of 255 on scale of 0-255) at similar or different intervals (e.g., every % point, every other % point, every 5% points, every 10% points, and so on). As such, the table 310 may be generated to correspond to any level of granularity over any range of pixel values and/or LTA values. Similarly, where a display is capable of operating at different refresh rates, or variable refresh rates, any number of tables 310A may be generated during testing or experimentation to determine the different luminance drop (or decay) values for the various supported frame rates. In some embodiments, such as where variable refresh rates are supported between 60 Hz and 120 Hz, for example, two or more tables 310A may be generated (e.g., a max refresh rate table corresponding to 120 Hz and a minimum refresh rate table corresponding to 60 Hz), and these tables 310A may ultimately be used to generate two or more lookup tables 310B—described herein—that may be interpolated between to determine micro decay rates for pixel cells of a display. The table 310A may correspond to a pixel cell type (e.g., a blue pixel cell type), and additional tables 310A may be generated for other pixel cell types (e.g., red pixel cell types or green pixel cell types) to account for the differing decay rates of different pixel cell types.

The measured per frame decay may then be statistically calculated using the table 310A. For example, if the luminance drop is 1.5% after 100 hours of 100% brightness at 60 Hz, this information may be used to determine the per frame decay (e.g., 60 frames per second for 100 hours equals 216000 frames per hour, or 21.6 million frames total, so the 1.5% luminance drop or decay may be used to attribute a luminance drop to each frame). This per frame decay may then be normalized and/or quantized. For example, the largest per frame decay may be normalized to 1, and/or quantized to a fixed point number. In the table 310A, the largest per frame decay may be the 100% pixel value and the 0% long term aging, so this value may be normalized to 1. The fixed point number may include values from 0 to 100, 0 to 255 (as illustrated in lookup table 310B of FIG. 3C), 0.00 to 1.00, and/or some other range of values. The normalization factor may be, as a non-limiting example, $2.72331E^{-10}$ for the decay value of 255 for a new panel with 60 Hz refresh rate having a 1.5% luminance drop after 100 hours driving the panel with 100% brightness. As such, when a maximum pixel value is driven to a new pixel cell, the lookup table 310B may be used to add, by the aging tracker 120, $2.72331E^{-10}$ as the amount of decay in the aging accumulation for the pixel. Each other normalized and/or quantized value in the table 310B may correspond to a decay value that is less than (e.g., some percentage of) the maximum decay value that was used for normalization and/or quantization. Similar to the description above with respect to the table 310A, the table 310B may include different ranges at different granularities for LTA and/or pixel value than those depicted (e.g., the same ranges and/or granularities as in table 310A). By normalizing and/or quantizing the decay values, the number of bits needed to store the values in the STA accumulator and/or the LTA accumulator may be reduced. For example, as described in more detail herein, where a 21 bit STA accumulator is used, the STA accumulator may be able to accumulate STA data for up to 8224 frames with a frame decay of 255 for each frame.

The lookup table(s) 310B may then be used to track the aging of the pixel cells over time. For example, a red pixel cell lookup table may be used to track aging for red pixel cells, a blue pixel cell lookup table may be used to track aging for blue pixels, and so on. Due to the micro decay associated with each frame, the aging tracking may be a long accumulation process. In addition, due to the fast refresh rates of displays 104 (e.g., 60 Hz, 120 Hz, 240 Hz, etc.), the accumulation data may require quick access memory in order to keep up with the refresh rate of the display 104 without adding any additional latency to the system 100. The aging data also may need to be stored in nonvolatile memory such that—in the event of power off—the aging history is maintained. As such, in some embodiments, the aging accumulation may include a short term aging (STA) accumulation (e.g., using faster access memory) and a long term aging (LTA) accumulation (e.g., using nonvolatile, potentially slower access memory). For example, the STA accumulation may be updated for each frame for each pixel cell, and the STA accumulation data may be stored in a fast access frame buffer 122—e.g., an external DDR and/or on-chip SRAM. The LTA accumulation data may be updated periodically (e.g., at an interval, after a number of frames, when the STA accumulator(s) is reaching a threshold capacity, and/or based on another criteria) from the STA accumulator. The LTA accumulator may include (external) FLASH memory, in embodiments.

Figure 4A:
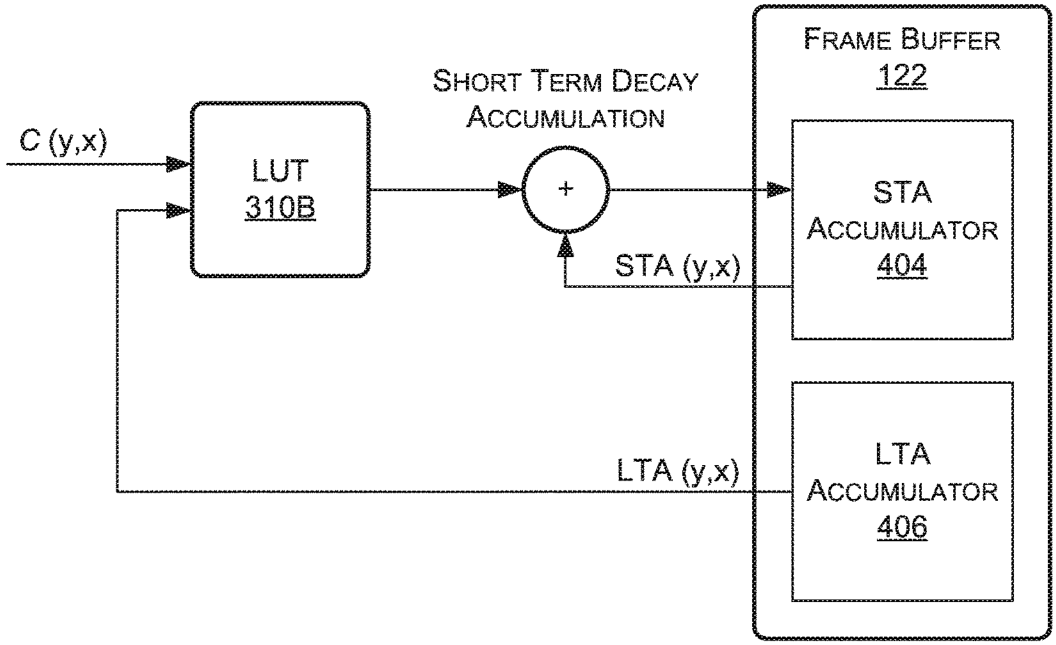
FIG. 4A depicts a data flow diagram for short term aging tracking or accumulation, in accordance with some embodiments of the present disclosure.

As an example, and with respect to FIG. 4A, one or more lookup tables 310B may be used to determine the micro decay for each pixel cell for each frame of operation. As described herein, the pixel value and the long term aging value may be the indices for determining the decay value (which may be normalized and/or quantized) in the table(s) 310B. Because only a subset of the pixel values at a subset of the long term aging values may be included in the table(s) 310B, linear interpolation may be used in embodiments to determine the decay value for a frame. For example, with respect to lookup table 310B of FIG. 3C, where the long term aging value is 7.5% and the pixel value is 50%, a value halfway between 97 and 93 (e.g., 95) may be selected, and the corresponding decay value (e.g., the decay value corresponding to 95) may be used for the decay value for the corresponding frame. A similar process may be executed where the pixel value is between the tabled pixel values. Where linear interpolation is used, the decay value selected may more accurately reflect the aging of the pixel cell for each frame and, as a result, over time. In some embodiments, however, linear interpolation may not be used. For example, a closest value in the lookup table 310B may be used, or, in other embodiments, weighting may be applied such that the value selected is weighted more toward a higher decay value, a lower decay value, a longer LTA, a shorter LTA, a higher pixel value, a lower pixel value, and/or the like.

As illustrated in FIG. 4A, an STA accumulator 404 may be included in the frame buffer 122. The bit depth of the STA accumulator 404 may dictate the frame buffer storage size and how frequently the STA data needs to be updated to LTA accumulator 406 (e.g., LTA accumulator 406 may include a copy of the LTA values stored in the frame buffer 122 for quick access when executing a lookup in the lookup table 310B using the LTA values). As a non-limiting example, the STA accumulator 404 may include a 21 bit depth, which may accumulate up to 8224 frames with a frame decay of 255 for each frame. After some criteria is satisfied—e.g., a number of frames is stored in the STA accumulator 404, a period of time expires, the STA accumulator 404 reaches a threshold capacity, etc.—the STA accumulated data may be updated to the LTA accumulator 406, the STA accumulator 404 may be reset, and the data from the LTA accumulator 406 may be used as the indices of LTA in the lookup table 310B for the pixel cell. This process may be repeated for each pixel cell at each frame.

In some embodiments, the display 104 and/or the application supplying the display data may support variable refresh rates. To support variable refresh rate, linear scaling from the aging model obtained for a typical refresh rate of the display may be used. For example, once the micro decay is calculated using the lookup table 310B and interpolation, the micro decay may be linearly scaled to actual refresh rate of the frame. This method, however, has a dependency that micro decay has constant linearity across pixel values and long term aging.

Figure 4B:
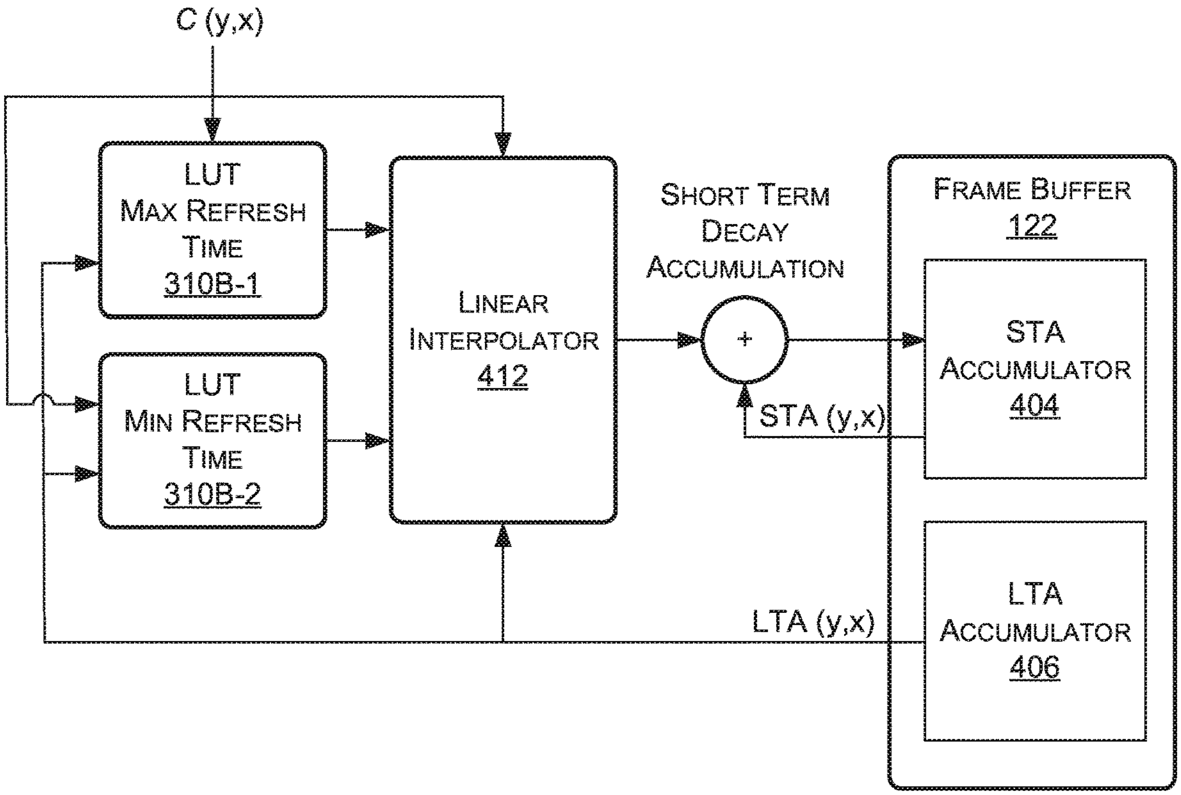
FIG. 4B depicts a data flow diagram for short term aging tracking or accumulation using variable refresh rates, in accordance with some embodiments of the present disclosure.

In other examples, and with reference to FIG. 4B, the system 100 may use more than one lookup table 310B—such as a max refresh time lookup table 310B-1 and a minimum refresh time lookup table 310B-2. As such, when a pixel color, C (y, x), is received, the LTA value from the LTA accumulator 406 and the pixel color may be used to perform a lookup in both the lookup table 310B-1 and the lookup table 310B-2. The decay values determined from the two lookup tables may then be applied to a linear interpolator 412 to determine the micro decay value to be used to update the STA accumulator 404 for the pixel cell. For example, where the lookup table 310B-1 corresponds to 240 Hz, the lookup table 310B-2 corresponds to 120 Hz, and the current refresh rate is 180 Hz, the decay value from the lookup table 310B-1 and the decay value from the lookup table 310B-2 may be applied to the linear interpolator 412, and a decay value between the two values may be determined to be the micro decay value for the frame. In some embodiments, however, linear interpolation may not be used. For example, a closest value from one of the lookup tables 310B may be used, or, in other embodiments, weighting may be applied such that the value selected is weighted more toward a higher decay value, a lower decay value, a first lookup table 310B-1, a second lookup table 310B-2, and/or the like. In addition, in some embodiments, more than two lookup tables may be used (e.g., a lookup table for 60 Hz, 120 Hz, and 240 Hz), and the lookup tables 310B used by the linear interpolator 412 may include the lookup tables 310B corresponding to refresh rates that are most closely above and below the current refresh rate of the display 104.

In some embodiments, to account for memory bandwidth constraints of some implementations, or to reduce memory bandwidth generally, temporal spatial sub-sample accumulation may be used. For example, for each frame, only a subset of a group of pixel cells may have a decay value computed, and the other pixel cells of the group may carry over the decay values for some number of frames. For example, where a group of pixel cells includes four different subsets, decay values for a first subset may be computed for a first frame, decay values for a second subset may be computed for a second frame and the decay value for the first subset may be carried over to the second frame, and so on, until the fourth frame, and then the first subset may be computed again.

For example, a first subset of pixel cell locations may include pixel cells labeled [(0, 0), (0, 1), (0, 2), (0, 3)], a second subset may include pixel cells labeled [(1, 0), (1, 1), (1, 2), (1, 3)], a third subset may include pixel cells labeled [(2, 0), (2, 1), (2, 2), (2, 3)], and a fourth subset may include pixel cells labeled [(3, 0), (3, 1), (3, 2), (3, 3)]. For 4× sub-sample, (STA) decay values may be accumulated only for pixel cells at (0, 0), (0, 2), (2, 0) and (2, 2) for a first frame, (0, 1), (0, 3), (2, 1), and (2, 3) for a second frame, (1, 0), (1, 2), (3, 0), and (3, 2) for a third frame, and (1, 1), (1, 3), (3, 1), and (3, 3) for a fourth frame. This ordering may be repeated over the lifetime of the panel. In such an example, the refresh time may be quadrupled, such that the decay value is carried over for four frames. For example, for a decay value of 255 for a pixel at (3, 0), the same decay value will effectively be applied for the measured frame and the next three frames. The example of 4× sub-sampling is non-limiting and, in some embodiments, other sub-sampling may be used—e.g., 6× (3×2), 9× (3×3), 16× (4×4), etc.

The benefit of sub-sampling may provide similar accuracy to frame by frame sampling, especially for static content that has the greatest impact on burn-in. For moving content—e.g., video—the difference between neighbor pixel cells is generally minimal, and the error may be considered to be randomly distributed over frames so as to have minimal impact on accuracy. However, by sub-sampling, the STA memory access bandwidth may be reduced by the sub-sampling factor (e.g., 4× in the above example). This reduction may be critical to maintain expected or optimal performance in cost sensitive systems.

Figure 4C:
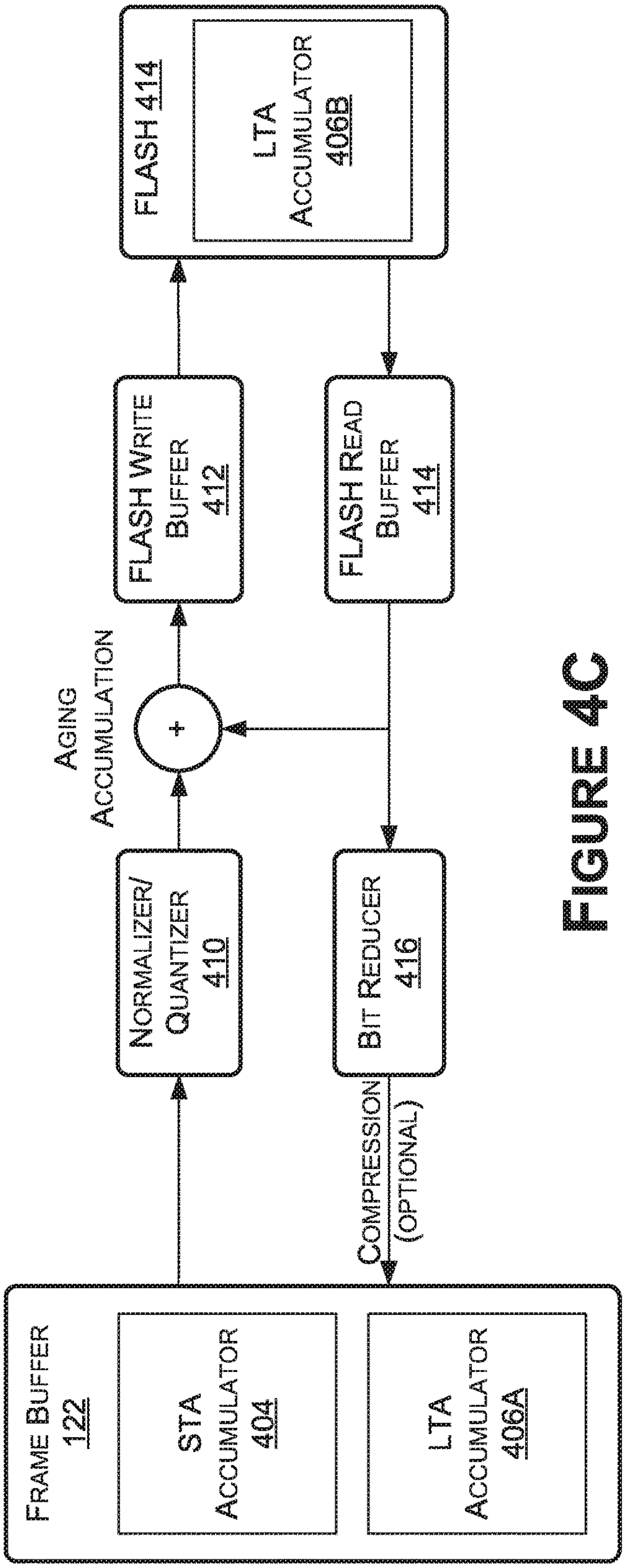
FIG. 4C depicts a data flow diagram for long term aging tracking or accumulation, in accordance with some embodiments of the present disclosure.

With respect to FIG. 4C, periodically, the STA accumulator 404 may need to be updated to the LTA accumulator 406B (e.g., FLASH memory). For example, the LTA accumulator 406B for each pixel cell may represent the percentage of luminance degradation. As a non-limiting example, a 32 bit LTA accumulator 406B for each pixel cell may be used, where 0×4,000,000 represents a 25% luminance degradation and 0×8,000,000 represents a 50% luminance degradation. The STA accumulator 404 and/or the LTA accumulator 406 may use the normalizer/quantizer 410 to normalize and/or quantize the STA values and/or the LTA values. For example, the same normalization and/or quantization values may be used that are used for generating the lookup table 310B of FIG. 3C from the table 310A of FIG. 3B. The STA accumulator 404 and the LTA accumulator 406B may be organized by tiles and/or lines of pixel cells, and the updates of the STA values from the STA accumulator 404 to the LTA accumulator 406B may be time multiplexed using time division multiplexing (TDM)—e.g., such that different tiles or lines are updated at different times. Updating the LTA accumulator 406B from the STA accumulator 404 may include normalization and/or quantization of the decay values, and then writing the LTA values to the LTA accumulator 406B in FLASH memory 414 using a FLASH write buffer 412. The LTA values updated in the LTA accumulator 406B may then be read out using a FLASH read buffer 414, compressed and/or reduced using a bit reducer 416 (e.g., 8 bits per pixel cell of LTA values may be stored in the frame buffer 122), and then used to update the LTA accumulator 406A in the frame buffer 122. The LTA accumulator 406A in the frame buffer 122 may include a copy of the LTA values or indices for use in determining decay values in the lookup table(s) 310B. The update to the LTA accumulator 406 and reset of the STA accumulator 404 may be executed at an expiration of an interval or a number of frames, when any of the STA accumulators 404 for any tile or line of pixel cells is near overflow, or a combination thereof to spread the tile or line update and limit single STA accumulation time. In some embodiments, the reduced bit STA values and/or LTA values in the frame buffer 122 may be further compressed using image compression techniques to reduce the frame buffer storage size.

Figure 5A:
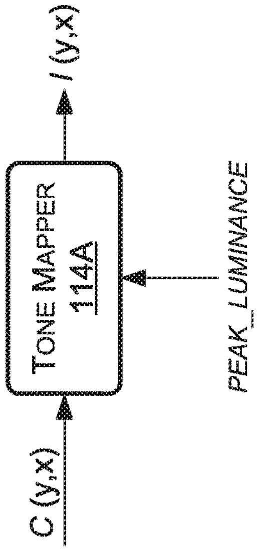
FIG. 5A depicts a data flow diagram for pixel value compensation using aging or decay values for high dynamic range applications, in accordance with some embodiments of the present disclosure.

The LTA values from the LTA accumulator 406 may be used to compensate for the aging or degradation of pixel cells of the display 104 such that light output from different pixel cells will have little to no variation even with burn-in (e.g., aging) present. For example, the aging compensator 118 may use the LTA values of the pixel cells to adjust the pixel or color values, C (y, x), to updated or compensated pixel or color values, C' (y, x). To determine the compensated or updated pixel values, the LTA value corresponding to the pixel cell of the display with the current maximum LTA value may be determined (e.g., the max_LTA of the display 104). Depending on whether standard dynamic range (SDR) or high dynamic range (HDR) is supported for the current frame, the compensation process may differ. For example, where HDR is used, and with respect to FIG. 5A, the maximum LTA value may be used to determine a current peak luminance, peak_luminance, of the display 104. The peak_luminance may be computed, as an example, according to equation (1), below:

$$\text{peak\_luminance}=\text{original\_peak\_luminance}*(1-\text{max\_LTA}) \quad (1)$$

The peak_luminance may then be used to determine an intermediate pixel value, I (y, x), using, for example, equation (2), below:

$$I(y,x)=\text{TMO}(C(y,x),\text{peak\_luminance}) \quad (2)$$

Where TMO corresponds to a tone mapping operator executed using a tone mapper 114A. As such, the pixel value, C (y, x), may be applied to the tone mapper 114A to compute the intermediate pixel value, I (y, x).

Figure 5B:
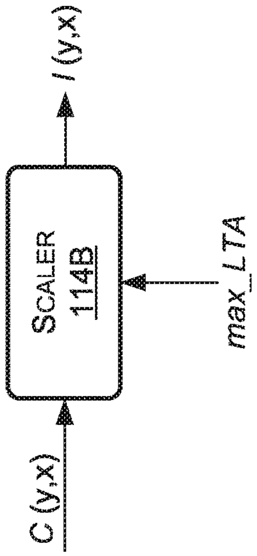
FIG. 5B depicts a data flow diagram for pixel value compensation using aging or decay values for standard dynamic range applications, in accordance with some embodiments of the present disclosure.

For another example, where SDR is used, and with respect to FIG. 5B, the maximum LTA value may be used to determine the intermediate pixel value, I (y, x), using a scaler 114B. The intermediate color value, I (y, x), may be computed, as an example, according to equation (3), below:

$$I(y,x)=C(y,x)*(1-\text{max\_LTA}) \quad (3)$$

In some embodiments, where SDR is used, a tone mapping operator may be used in addition or alternatively from the linear scaling operation.

Once the intermediate pixel value, I (y, x), is determined for either SDR or HDR, the updated or compensated pixel value, C' (y, x), may be computed. C' (y, x) may be computed, for example, according to equation (4), below:

$$C'(y,x)=\frac{J(y,x)}{1-LTA(y,x)} \quad (4)$$

Where LTA (y, x) corresponds to the LTA value for the pixel cell currently being adjusted. As such, the updated pixel value, C' (y, x), may be computed for any number of (e.g., each) pixel cell for each frame using the I (y, x) values and the LTA (y, x) value for the respective pixel cell. As a result, one or more of the pixel cells may have their respective pixel values adjusted to compensate for or account for the aging of the pixel cell with the most or the maximum LTA value. Burn-in or ghosting that would traditionally surface as a result of variations in the aging life of pixel cells may be less noticeable or unnoticeable, thereby improving the image quality of the display 104 and the user experience.

In some embodiments, such as where pixel cells are capable of producing more luminance than currently required, the compensation may include increasing the pixel value for the pixel cell(s) to increase the luminance of the pixel cell to a level that more closely resembles the initial pixel value. For example, where a pixel cell was originally capable of producing a luminance of 500 nits, but LTA has caused the maximum luminance for the pixel cell to drop to 400 nits, where a pixel value of 360 is to be driven, the compensated or updated pixel value may be greater than 360 (e.g., somewhere between 360 and 500 nits, or as an example, 450 nits) to compensate for the aging of the pixel cell. As another example, a pixel cell may be capable of 700 nits when new, but may only require 500 nits to reach a maximum luminance for use of the display 104. In such examples, the extra 200 nit capability of the pixel cell may be used over the life of the display 104 to compensate for the aging of the pixel cell.

Figure 6:
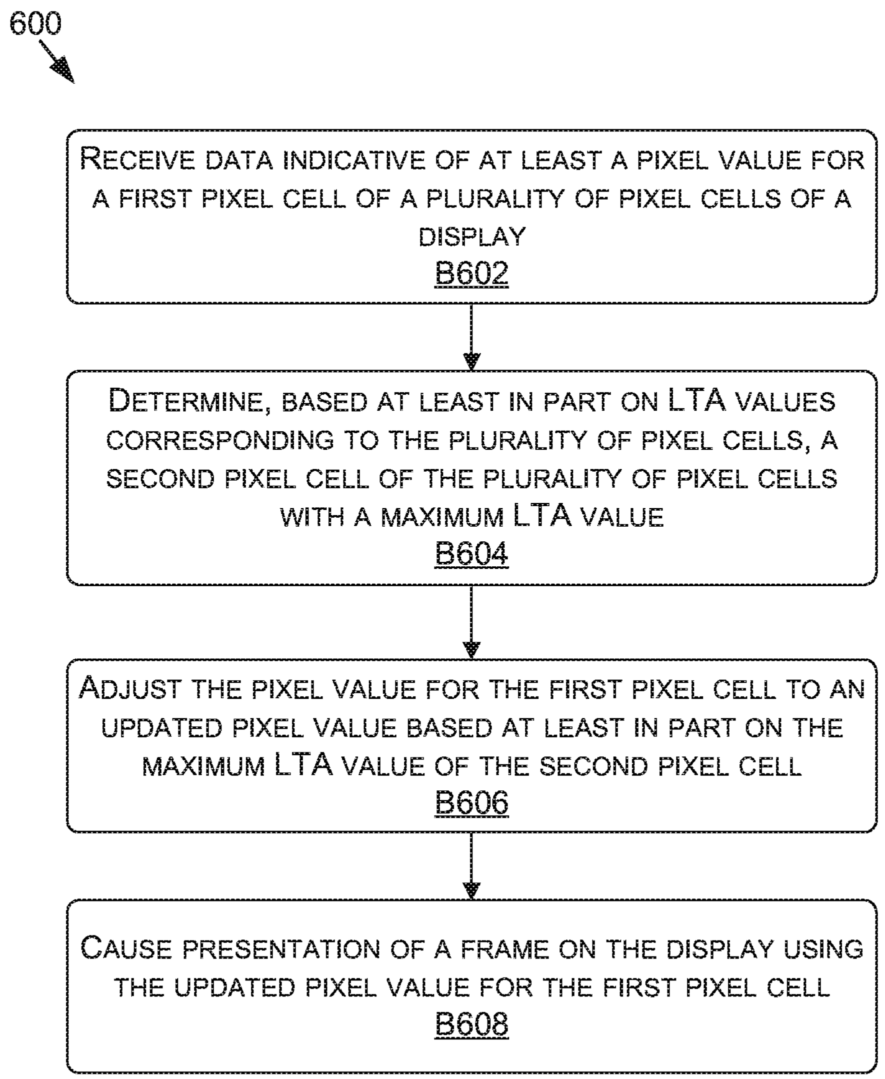
FIG. 6 includes an example flow diagram illustrating a method for pixel value compensation based on aging of pixel cells, in accordance with some embodiments of the present disclosure.
Figure 7:
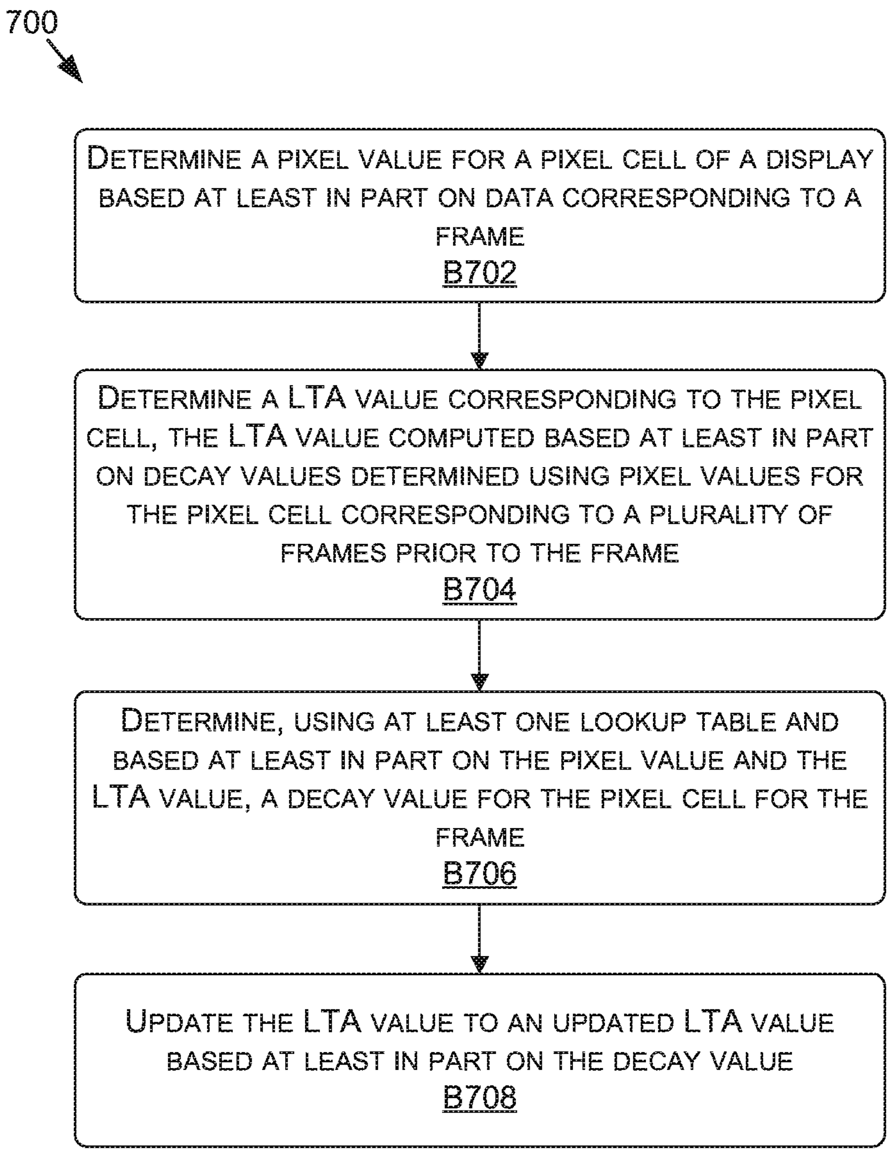
FIG. 7 includes an example flow diagram illustrating a method for pixel cell aging accumulation, in accordance with some embodiments of the present disclosure.

Now referring to FIGS. 6-7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, methods 600 and 700 are described, by way of example, with respect to the system 100 of FIG. 1. However, these methods may additionally or alternatively be executed by any one system, or any combination of systems, including, but not limited to, those described herein.

Now referring to FIG. 6, FIG. 6 includes an example flow diagram illustrating a method 600 for pixel value compensation based on aging of pixel cells, in accordance with some embodiments of the present disclosure. The method 600, at block B602, includes receiving data indicative of at least a pixel value for a first pixel cell of a plurality of pixel cells of a display. For example, image data indicative of a pixel value for one or more pixel cells of the display 104 may be received at the client device 102 and/or the display 104.

The method 600, at block B604, includes determining, based at least in part on LTA values corresponding to the plurality of pixel cells, a second pixel cell of the plurality of pixel cells with a maximum LTA value. For example, the aging compensator 118 may determine the pixel cell of the pixel cells of the display 104 that has the max_LTA value.

The method 600, at block B606, includes adjusting the pixel value for the first pixel cell to an updated pixel value based at least in part on the maximum LTA value of the second pixel cell. For example, the pixel values, C (y, x), for one or more pixel cells of the display 104 may be updated to updated pixel values, C' (y, x), based on the max_LTA value—e.g., using one or more of equations (1)-(4).

The method 600, at block B608, includes causing presentation of a frame on the display using the updated pixel value for the first pixel cell. For example, a current frame corresponding to the pixel values, C (y, x), may be displayed using the one or more updated pixel values, C' (y, x).

With reference to FIG. 7, FIG. 7 includes an example flow diagram illustrating a method 700 for pixel cell aging accumulation, in accordance with some embodiments of the present disclosure. The method 700, at block B702, includes determining a pixel value for a pixel cell of a display based at least in part on data corresponding to the frame. For example, image data received by the client device 102 and/or the display 104 may be used to determine a pixel value, C (y, x), for a pixel cell of the display 104.

The method 700, at block B704, includes determining an LTA value corresponding to the pixel cell, the LTA value computed based at least in part on decay values determined using pixel values for the pixel cell corresponding to a plurality of frames prior to the frame. For example, the LTA value may be determined from the LTA accumulator 406B in the frame buffer 122, where the LTA value has been accumulated over time using the STA accumulator 404.

The method 700, at block B706, includes determining, using at least one lookup table and based at least in part on the pixel value and the LTA value, a decay value for the pixel cell for the frame. For example, the pixel value and the LTA value may be used to determine a decay value for a frame using one or more lookup tables 310B.

The method 700, at block B708, includes updating the LTA value to an updated LTA value based at least in part on the decay value. For example, the aging value may be updated in the STA accumulator 404 and, after some criteria is satisfied, the STA accumulator 404 may be used to update the LTA accumulator 406 and the corresponding LTA value for the pixel cell therein.

Example Computing Device

Figure 8:
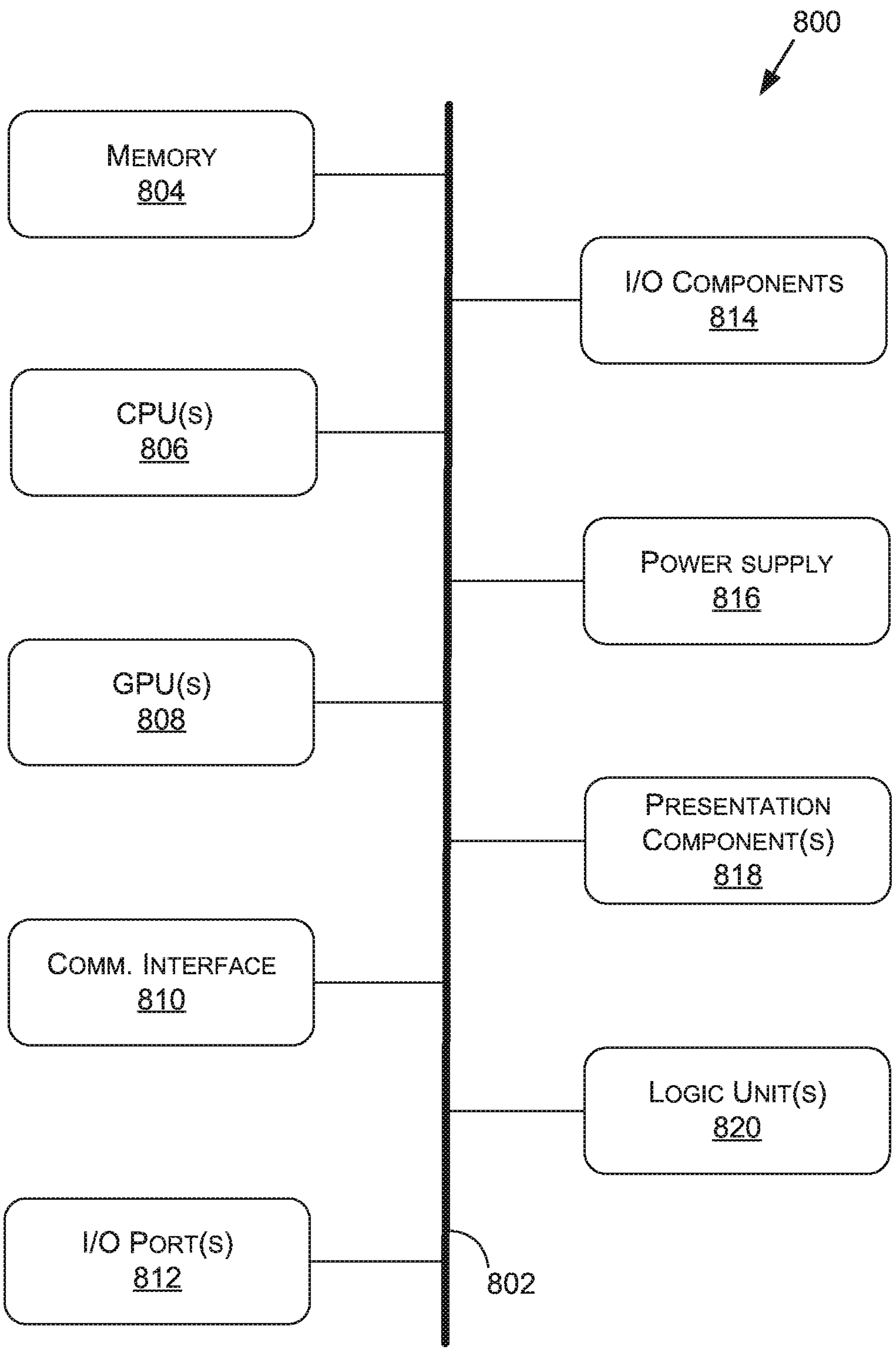
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Data Center

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, and/or other processors may be grouped within one or more racks to provide compute resources to support one or more workloads. The one or more racks may also include any number of power modules, cooling modules, and/or network switches, in any combination.

The resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for the data center 900. The resource orchestrator 922 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 1036 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

receiving data indicative of at least a pixel value for a pixel cell of a plurality of pixel cells of a display, the pixel value corresponding to a frame to be presented using the display;

accessing, using the data, a long term accumulator to retrieve one or more long term aging (LTA) values from the long term accumulator and corresponding to the pixel cell, the one or more LTA values determined based at least on decay values computed over a first plurality of frames;

based at least on the accessing, adjusting the pixel value for the pixel cell to an updated pixel value corresponding to the one or more LTA values and determining a decay value corresponding to the one or more LTA values and the frame;

updating, in a short term accumulator and using the decay value, at least one accumulated short term aging (STA) value corresponding to STA values accumulated for the pixel cell over a second plurality of frames that are subsequent to and fewer than the first plurality of frames, the updating causing the at least one accumulated STA value to represent decay to the pixel cell caused by the second plurality of frames and at least one additional frame based at least on adding an STA value corresponding to the decay value and the updated pixel value to the at least one accumulated STA value;

updating the one or more LTA values in the long term accumulator based at least on adding the at least one accumulated STA value to the one or more LTA values to cause the one or more LTA values to represent decay to the pixel cell caused by the first plurality of frames, the second plurality of frames, and the at least one additional frame; and causing presentation of the frame on the display using the updated pixel value for the pixel cell.

2. The method of claim 1, wherein the one or more LTA values retrieved from the long term accumulator represents decay to the pixel cell caused by the first plurality of frames.

3. The method of claim 1, wherein the accessing of the long term accumulator is from a compressed version of the long term accumulator, the compressed version being synchronized with an uncompressed version of the long term accumulator that is stored in nonvolatile memory.

4. The method of claim 1, wherein the STA value is predetermined by at least one lookup table, and the STA value is determined for the pixel cell based at least on identifying the decay value for the STA value in the at least one lookup table using the one or more LTA values, the at least one lookup table being indexed by LTA values.

5. The method of claim 4, wherein:

the at least one lookup table includes a first lookup table corresponding to a first frame rate and a second lookup table corresponding to a second frame rate; and the identifying the decay value includes determining a first decay value from the first lookup table, a second decay value from the second lookup table, and, based at least on a frame rate corresponding to the frame, using linear interpolation between the first decay value and the second decay value to identify the decay value.

6. The method of claim 1, wherein the updated pixel value for the frame does not correspond to the at least one accumulated short term aging (STA) value the updating of the one or more LTA values causes future updated pixel values to correspond to the at least one accumulated STA value.

7. The method of claim 1, wherein the adjusting the pixel value for the pixel cell includes at least one of:

when the display is in a standard dynamic range (SDR) mode, executing at least one of a linear scaling operation or a tone mapping operation based at least on the one or more LTA values and the pixel value; or when the display is in a high dynamic range (HDR) mode, executing a tone mapping operation based at least on the one or more LTA values and the pixel value.

8. The method of claim 1, further comprising:

updating, using the at least one accumulated STA value from the short term accumulator, the one or more LTA values in the long term accumulator to correspond to the first plurality of frames and the second plurality of frames;

based at least on the updating the one or more LTA values in the long term accumulator:

resetting, in the short term accumulator, the at least one accumulated STA value such that the at least one accumulated STA value no longer corresponds to the second plurality of frames;

adjusting the pixel value for the pixel cell to a second updated pixel value based at least on the one or more LTA values from the long term accumulator; and accumulating STA values to the at least one accumulated STA value for a third plurality of frames that is subsequent to the second plurality of frames.

9. The method of claim 1, further comprising:

responsive to a condition being satisfied, updating the long term accumulator with the at least one accumulated STA value from the short term accumulator, the condition including at least one of a period of time expiring, a number of frames displayed meeting or exceeding a threshold number of frames, or a current storage amount of the short term accumulator being within a threshold to a storage capacity.

10. A system comprising:

one or more processing units to execute operations comprising:

receiving data indicative of pixel values for a plurality of pixel cells of a display, the pixel values corresponding to a frame to be presented using the display;

accessing, using the data, a long term accumulator to retrieve long term aging (LTA) values from the long term accumulator and corresponding to the plurality of pixel cells, the LTA values determined based at least on decay values computed over a first plurality of frames;

based at least on the accessing, adjusting the pixel values for the plurality of pixel cells to updated pixel values corresponding to the LTA values and determining decay values corresponding to the LTA values and the frame;

updating, in a short term accumulator and using the decay values, at least one accumulated short term aging (STA) value corresponding to STA values accumulated for the plurality of pixel cells over a second plurality of frames that are subsequent to and fewer than the first plurality of frames, the updating causing the at least one accumulated STA value to represent decay to the plurality of pixel cells caused by the second plurality of frames and at least one additional frame based at least on adding an STA value corresponding to the decay values and the updated pixel values to the at least one accumulated STA value;

updating the LTA values in the long term accumulator based at least on adding the at least one accumulated STA value to the LTA values to cause the LTA values to represent decay to the plurality of pixel cells caused by the first plurality of frames, the second plurality of frames, and the at least one additional frame; and causing presentation of the frame on the display using the updated pixel values for the plurality of pixel cells.

11. The system of claim 10, wherein the decay values are precomputed and stored in at least one lookup table, and determining the LTA values includes identifying a decay value for a respective frame of the first plurality of frames using the at least one lookup table.

12. The system of claim 11, wherein the identifying the decay value for the respective frame is based at least on at least one of the LTA values, the pixel values, or a refresh rate of the display.

13. The system of claim 11, wherein the adjusting the pixel values includes at least one of:

when the display is in a standard dynamic range (SDR) mode, executing at least one of a linear scaling operation or a tone mapping operation based at least on the LTA values and the pixel values; or when the display is in a high dynamic range (HDR) mode, executing a tone mapping operation based at least on the LTA values and the pixel values.

14. The system of claim 10, further comprising:

determining decay rates corresponding to the accumulated STA values using the pixel values and the LTA values, wherein at least two of the decay rates are different for at least two of the plurality of pixel cells based at least on the at least two of the plurality of pixel cells having a same pixel value, a same display time, and a different LTA value.

15. The system of claim 10, wherein the operations further comprise:

responsive to a condition being satisfied, updating the long term accumulator with the accumulated STA values from the short term accumulator, the condition corresponding to a current storage amount of the short term accumulator being within a threshold to a storage capacity.

16. A method comprising:

determining a pixel value for a pixel cell of a display based at least in part on data corresponding to a frame;

accessing, using the data, a long term accumulator to retrieve a long term aging (LTA) value from the long term accumulator and corresponding to the pixel cell, the LTA value computed based at least in part on first decay values determined using first pixel values for the pixel cell corresponding to a first plurality of frames prior to the frame;

based at least on the accessing, determining, using at least one lookup table and based at least in part on the pixel value and the LTA value, a short term aging (STA) value for the pixel cell for the frame;

updating, in a short term accumulator, an accumulated STA value corresponding to STA values accumulated for the pixel cell over a second plurality of frames that are subsequent to and fewer than the first plurality of frames, the updating causing the accumulated STA value to represent decay to the pixel cell caused by the second plurality of frames and at least one additional frame based at least on adding the STA value to the accumulated STA value;

updating the LTA value in the long term accumulator based at least on adding the accumulated STA value to the LTA value to cause the LTA value to represent decay to the pixel cell caused by the first plurality of frames, the second plurality of frames, and the at least one additional frame; and updating the LTA value to an updated LTA value in the long term accumulator based at least in part on the accumulated STA value.

17. The method of claim 16, further comprising:

determining a given LTA value corresponding to pixel cells of the display;

adjusting the pixel value to an updated pixel value based at least in part on the LTA value and the given LTA value; and causing presentation of the frame on the display using the updated pixel value for the pixel cell.

18. The method of claim 16, wherein the at least one lookup table is generated based at least on testing pixel cells of a test display of a same display type as the display, the testing pixel cells including applying varying pixel values to the pixel cells at varying LTA values to determine associated decay values.

19. The method of claim 18, wherein the associated decay values are normalized based at least on a determined largest decay value and quantized to a fixed point number.

20. The method of claim 16, wherein:

the at least one lookup table includes a first lookup table corresponding to a first frame rate and a second lookup table corresponding to a second frame rate; and the determining the STA value includes determining a first decay value from the first lookup table, a second decay value from the second lookup table, and, based at least on a frame rate corresponding to the frame, using linear interpolation between the first decay value and the second decay value to identify the STA value.

21. The method of claim 16, wherein:

the pixel cell is a first pixel cell;

the first pixel cell is included in a sub-group of pixel cells of the display;

the sub-group of pixel cells includes a second pixel cell;

decay values for the first pixel cell are computed for every xth frame; and decay values for the second pixel cell are computed every xth+1 frame such that the decay values for the first pixel cell are computed at different frames than the decay values for the second pixel cell.

22. The method of claim 21, wherein a decay value for the first pixel cell at an xth+1 frame is a same value as the decay value for the second pixel cell at the xth frame.

* * * * *